U. G. GREER.
SHOCK LOADER.
APPLICATION FILED JAN. 19, 1917.
1,253,170.
Patented Jan. 8, 1918.
2 SHEETS—SHEET 1.
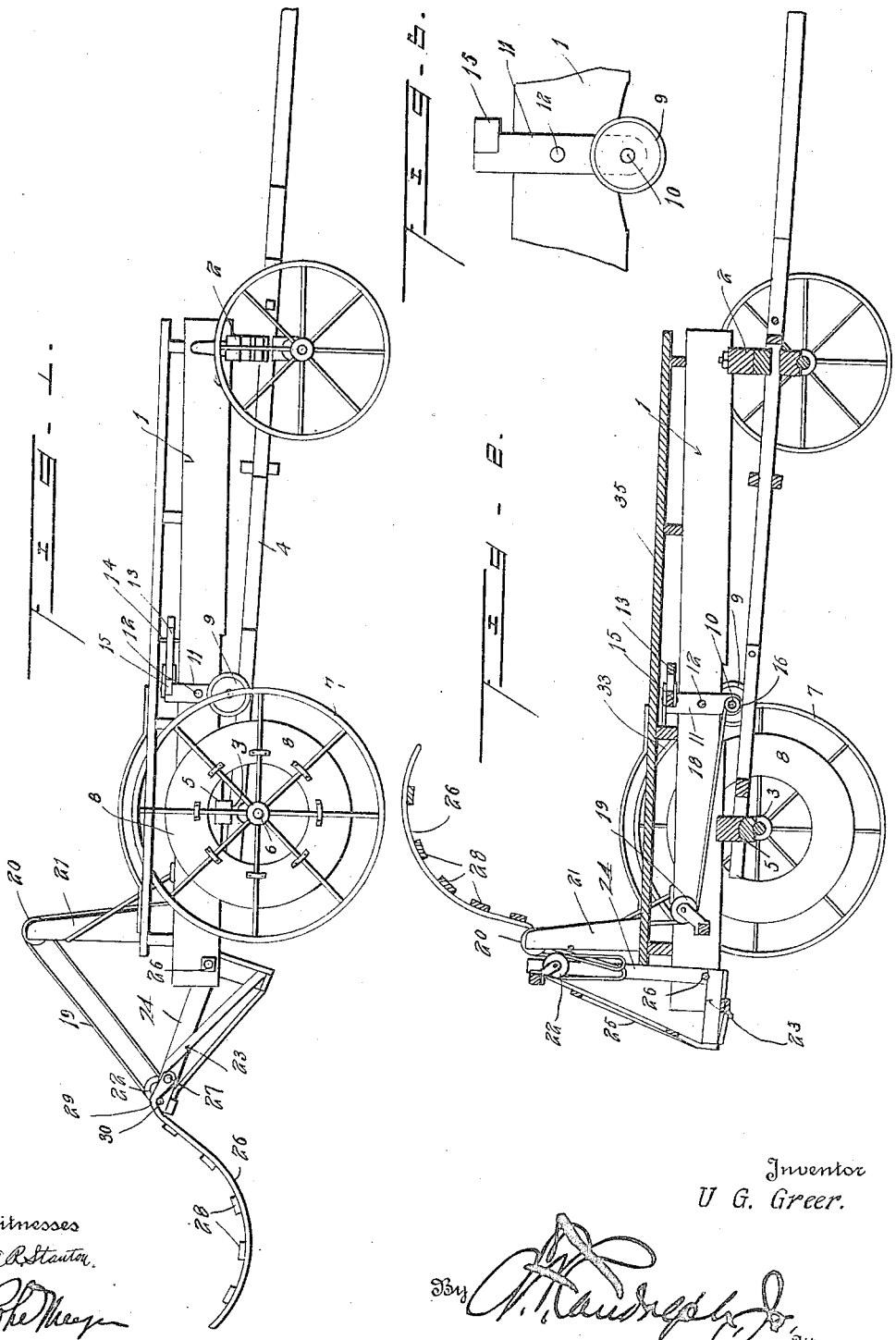
Inventor
U G. Greer.
Witnesses

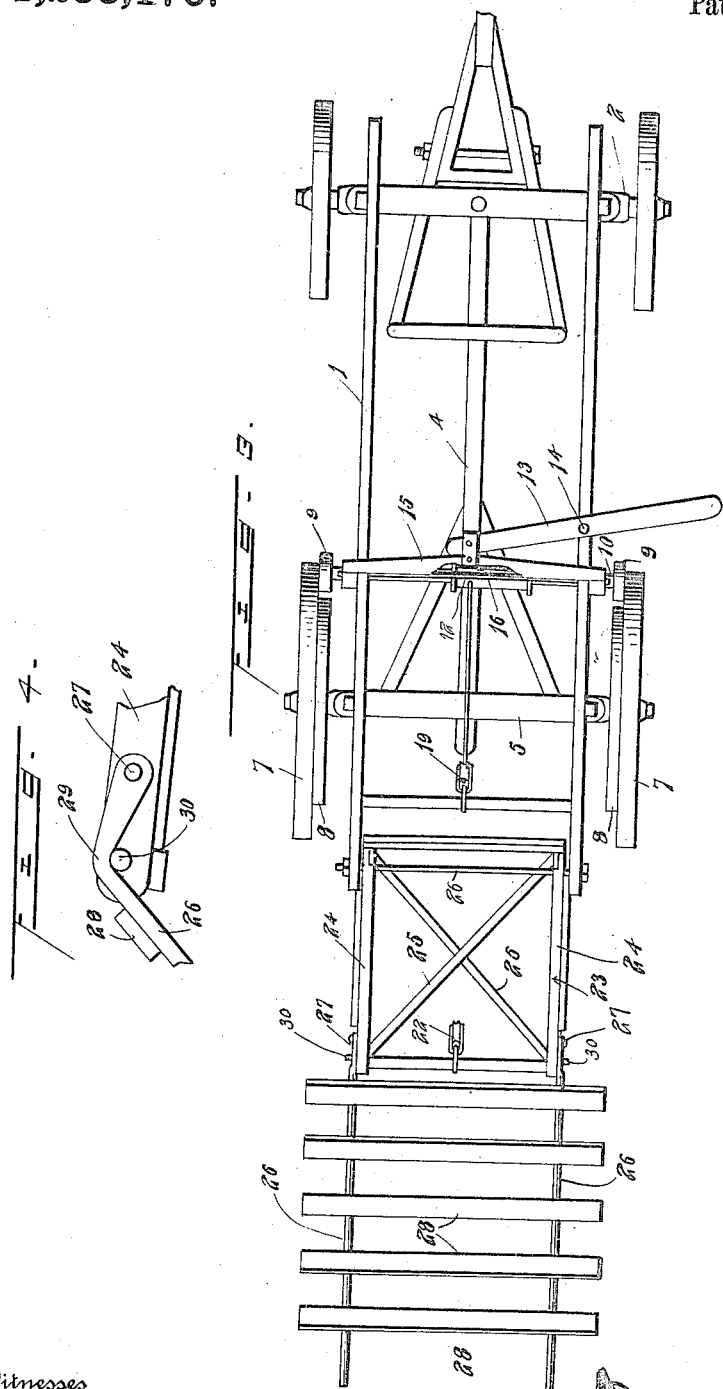

UNITED STATES PATENT OFFICE.

URASMUS GREEN GREER, OF ANDERSON, MISSOURI.

SHOCK-LOADER.

1,253,170.  Specification of Letters Patent.  Patented Jan. 8, 1918.

Application filed January 19, 1917. Serial No. 143,280.

*To all whom it may concern:*

Be it known that I, URASMUS G. GREER, a citizen of the United States, residing at Anderson, in the county of McDonald and State of Missouri, have invented certain new and useful Improvements in Shock-Loaders; and I do hereby declare the following to be a full, clear, and exact description of the invention, such as will enable others skilled in the art to which it appertains to make and use the same.

This invention relates to a device which is particularly designed for loading corn or fodder shocks upon a wagon for transportation, and one which may be utilized for loading shocks of wheat, or analogous grain.

The primary object of the invention is to provide a shock loader and conveyer, as specified which includes a cradle structure which is pivotally supported rearwardly of the rear end of a wagon structure, into which cradle or carrier structure the shocks are tipped by the operator, and further to provide means operable by the forward travel of the wagon for raising the carrier or cradle structure upwardly for dumping the load carried thereby upon the wagon bed.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings wherein like characters designate like and corresponding parts throughout the several views, and in which:

Figure 1 is a side elevation of the improved loader.

Fig. 2 is a longitudinal section through the loader showing the cradle structure elevated into a dumping position.

Fig. 3 is a plan view of the loader structure having the wagon bed removed.

Fig. 4 is an enlarged detail view illustrating a part of the cradle or carrier construction, and Fig. 5 is an enlarged detail view of a part of the shock loader structure.

Referring more particularly to the drawings, 1 designates the main supporting structure or running gears of the wagon as an entirety, which supporting structure has the usual type of front running gears 2, and rear running gears 3 which are connected by a coupling pole 4. The rear running gear structure 3 includes bolsters 5, and an axle 6 which is carried by the bolsters 5. The axle 6 has the usual type of supporting wheels 7 mounted upon the spindle end.

The supporting wheels 7 have friction wheels 8 attached to their inner surfaces, which friction wheels are adapted for peripheral engagement with the relatively small friction wheels 9. The friction wheels 9 are mounted upon a shaft 10, which shaft is rotatably carried by a pair of pivotally mounted bars 11. The bars 11 are pivotally mounted upon a rod 12 which extends transversely across the frame 1. A hand lever 13 is pivotally connected as shown at 14 to the supporting frame and it has its inner end connected to a bar 15, which bar is in turn connected to the upper end of the bars 11, so that when the hand lever 15 is oscillated it will rock the bars 11 upon their pivotal support 12 for moving the friction wheels 9 into or out of peripheral engagement with the friction wheels 8. When the friction wheels 9 are moved into engagement with the friction wheels 8 they will rotate the shaft 10 upon which they are mounted and consequently rotate the drum 16 which is carried by the shaft.

A cable or cord 18 is connected to the drum 16 and it extends rearwardly about a sheave guide pulley 19, upwardly over a second sheave pulley 20, which is carried by a standard structure 21, downwardly and about a pulley 22 which is carried by the pivoted frame structure 23 of the cradle or carrier and upwardly to the standard 21 to which it is attached so that when the shaft 10 is rotated in a winding direction for winding the cable 18 thereon it will raise the carrier or cradle upwardly into a dumping position as illustrated in Fig. 2 of the drawings and when the lever 13 is moved for moving the friction wheels 9 out of engagement with the friction wheels 8, the weight of the carrier structure will unwind the cable from the drum 16 and consequently allow the lowering of the cradle structure 23. The cradle structure 23 comprises a frame work 24 which is spaced by suitable braces 25, and which is further pivotally connected through the medium of a rod 26 to the rear end of the supporting frame 1 of the wagon structure. The side rails 24 have a pair of arms 26 pivotally connected thereto as shown at 27, which arms extend rearwardly and downwardly from the frame 23, when the carrier is in its normal position. The arms 26 are curved to form a cradle or carrier structure having a concave upper surface for fitting and receiving a shock of corn, or any other type of grain. Suitable slats 28 are attached in any suitable manner to the rods or arms 26 and form means for facilitating in the support of a shock of grain. The arms 26 are bent as shown at 29 to provide humps the inner concave surface of which engage pins 30 carried by the side rails 24 for limiting the downward movement of the carrier formed of the arms 26 and slats 28.

When it is desired to haul corn or fodder shocks from the field to the barn, or to a shredder, the improved loader and wagon structure is drawn through the field so that one end of the carrier formed of the arms 26 and slats 28 will be facing the shocks after which the shock is tilted over into the carrier. When the shock is positioned in the carrier, the lever 13 is operated for moving the friction wheels 9 into engagement with the friction wheels 8 which will rotate the shaft 10 in a winding direction and wind the cable 18 thereon, elevating the carrier or cradle structure 23 upwardly over the top or platform 35 of the wagon structure 1 upon which platform the shocks will be deposited. After the shock has been deposited upon the platform 35 the hand lever 13 is released or again moved upon its pivotal support 14 for moving the friction wheel 9 out of engagement with the friction wheel 8. This allows the shaft 10 to rotate idly in an unwinding direction which rotation is caused by the downward movement of the cradle or carrier structure 23, under its own weight.

In reducing the invention to practice certain minor features of construction, combination and arrangement of parts may necessitate alterations to which the patentee is entitled provided such alterations are comprehended within the scope of what is claimed.

What is claimed is:

1. In a shock loader structure, the combination with a wagon structure, of a frame pivotally connected to the rear end of said wagon structure, a pair of arcuate arms pivotally connected to said pivoted frame near its outer free end, said arms having their concaved surfaces positioned upwardly and a plurality of slats attached to the upper surface of said arms.

2. In a shock loader structure, the combination with a wagon frame, of a frame pivotally connected to the rear end of the wagon structure, a pair of arcuate arms pivotally connected to said pivoted frame near its outer free ends, said arms having their concaved surfaces positioned upwardly, a plurality of slats attached to the upper surfaces of said arms, said arms being bent near their pivots to form humps, pins carried by said frame for engagement with the humps of said arms for limiting the downward pivotal movement of the arms.

In testimony whereof I affix my signature in presence of two witnesses.

URASMUS GREEN GREER.

Witnesses:
O. L. EPPARD,
J. F. TATUM.